(12) United States Patent
Nishikawa

(10) Patent No.: US 12,027,884 B2
(45) Date of Patent: Jul. 2, 2024

(54) INFORMATION PROCESSING DEVICE, INFORMATION PROCESSING SYSTEM, DATA GENERATION METHOD, AND NON-TRANSITORY COMPUTER READABLE MEDIUM

(71) Applicant: NEC Corporation, Tokyo (JP)

(72) Inventor: Yoshiaki Nishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 17/978,365

(22) Filed: Nov. 1, 2022

(65) Prior Publication Data

US 2023/0155422 A1     May 18, 2023

(30) Foreign Application Priority Data

Nov. 12, 2021  (JP) .................................. 2021-184633

(51) Int. Cl.
*H02J 50/60*     (2016.01)
*H02J 50/20*     (2016.01)

(52) U.S. Cl.
CPC .............. *H02J 50/60* (2016.02); *H02J 50/20* (2016.02)

(58) Field of Classification Search
CPC .................................. H02J 50/60; H02J 50/20
See application file for complete search history.

(56) References Cited

U.S. PATENT DOCUMENTS

2020/0076245 A1*  3/2020  Jin ............................ H02J 7/02
2022/0014285 A1   1/2022  Nakamura et al.
2022/0094212 A1*  3/2022  Takabayashi ........... H02J 50/20

FOREIGN PATENT DOCUMENTS

WO     2020/090540 A1     5/2020

* cited by examiner

*Primary Examiner* — Jeffrey M Shin
(74) *Attorney, Agent, or Firm* — Sughrue Mion, PLLC

(57) ABSTRACT

An example object of the present disclosure is to provide an information processing device that is capable of generating a received power distribution around a shield or an obstacle. The information processing device according to the present disclosure includes a detection unit configured to detect presence of an obstacle by using a measurement value of received power measured by a measurement device that receives a wireless radio wave, an estimation unit configured to estimate a change in received power in a predetermined area before detecting presence of the obstacle and after detecting presence of the obstacle, and an updating unit configured to update a first received power distribution in the predetermined area being stored in a storage device, which is generated based on the measurement value before detecting presence of the obstacle, by using the change in received power.

7 Claims, 14 Drawing Sheets

| -90 | | -90 | | |
|---|---|---|---|---|
| -90 | | -90 | | |
| -90 | | -90 | | |
| -90 | | -90 | | |
| -90 | | -90 | | |

Fig. 9

| -90 | -90 | -90 | -90 | -90 |
|---|---|---|---|---|
| -90 | -90 | -90 | -90 | -90 |
| -90 | -90 | -90 | -90 | -90 |
| -90 | -90 | -90 | -90 | -90 |
| -90 | -90 | -90 | -90 | -90 |

Fig. 10

| -90 | | -90 | | |
|---|---|---|---|---|
| -97 | | -90 | | |
| -99 | | -90 | | |
| -97 | | -90 | | |
| -90 | | -90 | | |

Fig. 12

| -70 | -70 | -70 | -70 | -70 |
|---|---|---|---|---|
| -70 | -70 | -70 | -70 | -70 |
| -70 | -70 | -70 | -70 | -70 |
| -70 | -70 | -70 | -70 | -70 |
| -70 | -70 | -70 | -70 | -70 |

Fig. 13

| −70 | −70 | −70 | −70 | −70 |
|---|---|---|---|---|
| −77 | −77 | −77 | −77 | −77 |
| −79 | −79 | −79 | −79 | −79 |
| −77 | −77 | −77 | −77 | −77 |
| −70 | −70 | −70 | −70 | −70 |

Fig. 14

| 0 | 0 | 0 | 0 | 0 |
|---|---|---|---|---|
| −7 | −7 | −7 | −7 | −7 |
| −9 | −9 | −9 | −9 | −9 |
| −7 | −7 | −7 | −7 | −7 |
| 0 | 0 | 0 | 0 | 0 |

Fig. 15

| -90 | -90 | -90 | -90 | -90 |
|---|---|---|---|---|
| -97 | -97 | -97 | -97 | -97 |
| -99 | -99 | -99 | -99 | -99 |
| -97 | -97 | -97 | -97 | -97 |
| -90 | -90 | -90 | -90 | -90 |

Fig. 16

| -90 |  | -90 |  |  |
|---|---|---|---|---|
| -93 |  | -90 |  |  |
| -95 |  | -90 |  |  |
| -93 |  | -90 |  |  |
| -90 |  | -90 |  |  |

Fig. 17

INFORMATION PROCESSING DEVICE, INFORMATION PROCESSING SYSTEM, DATA GENERATION METHOD, AND NON-TRANSITORY COMPUTER READABLE MEDIUM

INCORPORATION BY REFERENCE

This application is based upon and claims the benefit of priority from Japanese patent application No. 2021-184633, filed on Nov. 12, 2021, the disclosure of which is incorporated herein in its entirety by reference.

TECHNICAL FIELD

The present disclosure relates to an information processing device, an information processing system, a data generation method, and a program.

BACKGROUND ART

Wireless communication using radio waves is utilized in various fields, and received power when receiving radio waves is one of important factors in evaluating quality of wireless communication. For example, a received power distribution may be generated when the quality of wireless communication in a certain area is evaluated. The received power distribution refers to a distribution of received power in a certain region, and by visualizing the distribution of received power, it becomes easy to estimate the quality of wireless communication spatially.

When a received power distribution of a certain region is calculated based on actual observation data, the received power distribution is calculated by observing received power at each position in the region by using a sensor that receives a radio wave and outputs received power. Since the observation is performed in a discrete space at this time, a spatial interpolation method such as IDW method or Kriging method is generally used in order to calculate a received power distribution in a continuous space or a more detailed discrete space. In these methods, a property of the received power that values of received power are close at a close position or at a short distance is used.

When the received power cannot be simultaneously observed at a desired observation point, the received power is observed at different times. In this case, results of the received power observed at different times are reflected in the same received power distribution. For example, a situation is assumed in which a sensor is installed on a moving body such as a person or a vehicle, and a position where the received power is observed and the received power are collected on a locus where the moving body moves.

On the other hand, it is generally known that radio waves attenuate due to an influence of obstacles and the received power of radio waves received by a receiver decreases. Patent Literature 1 (International Patent Publication No. WO 2020/090540) discloses a configuration of an estimation device which, when a receiver receives a wireless signal, calculates a propagation loss from received power and acquires the number of shields between a transmitter and the receiver by using the propagation loss.

SUMMARY

However, the estimation device disclosed in Patent Literature 1 can acquire the number of shields existing between the transmitter and the receiver, but cannot estimate received power around the shields. Therefore, even when an estimated result being output from the estimation device that is disclosed in Patent Literature 1 is used, there is a problem that a received power distribution around the shield cannot be generated.

An example object of the present disclosure is to provide an information processing device, an information processing system, a data generation method, and a program that are capable of generating a received power distribution around a shield or an obstacle.

An information processing device according to a first example aspect of the present disclosure includes: a detection unit configured to detect presence of an obstacle by using a measurement value of received power measured by a measurement device that receives a wireless radio wave; an estimation unit configured to estimate a change in received power in a predetermined area before detecting presence of the obstacle and after detecting presence of the obstacle; and an updating unit configured to update a first received power distribution in the predetermined area being stored in a storage device, which is generated based on the measurement value before detecting presence of the obstacle, by using the change in received power.

An information processing system according to a second example aspect of the present disclosure includes: a measurement device configured to measure received power of a wireless radio wave; and an information processing device provided with: a detection unit configured to detect presence of an obstacle by using a measurement value of received power measured by the measurement device; an estimation unit configured to estimate a change in received power in a predetermined area before detecting presence of the obstacle and after detecting presence of the obstacle; and an updating unit configured to update a first received power distribution in the predetermined area being stored in a storage device, which is generated based on the measurement value before detecting presence of the obstacle, by using the change in received power.

A data generation method according to a third example aspect of the present disclosure includes: detecting presence of an obstacle by using a measurement value of received power measured by a measurement device that receives a wireless radio wave; estimating a change in received power in a predetermined area before detecting presence of the obstacle and after detecting presence of the obstacle; and updating a first received power distribution in the predetermined area being stored in a storage device, which is generated based on the measurement value before detecting presence of the obstacle, by using the change in received power.

A program according to a fourth example aspect of the present disclosure causes a computer to execute: detecting presence of an obstacle by using a measurement value of received power measured by a measurement device that receives a wireless radio wave; estimating a change in received power in a predetermined area before detecting presence of the obstacle and after detecting presence of the obstacle; and updating a first received power distribution in the predetermined area being stored in a storage device, which is generated based on the measurement value before detecting presence of the obstacle, by using the change in reception power.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 9 is a diagram illustrating an actual measurement value of received power measured by the measurement device according to the second example embodiment;

FIG. 10 is a diagram illustrating a received power distribution according to the second example embodiment;

FIG. 12 is a diagram illustrating an actual measurement value of received power measured by the measurement device according to the second example embodiment;

FIG. 13 is a diagram illustrating a received power distribution acquired by a simulation according to the second example embodiment;

FIG. 14 is a diagram illustrating a received power distribution acquired by a simulation according to the second example embodiment;

FIG. 15 is a diagram illustrating a difference distribution of received power according to the second example embodiment;

FIG. 16 is a diagram illustrating a received power distribution according to the second example embodiment;

FIG. 17 is a diagram illustrating an actual measurement value of received power measured by a measurement device according to a third example embodiment;

EXAMPLE EMBODIMENT

First Example Embodiment

Figure 1:
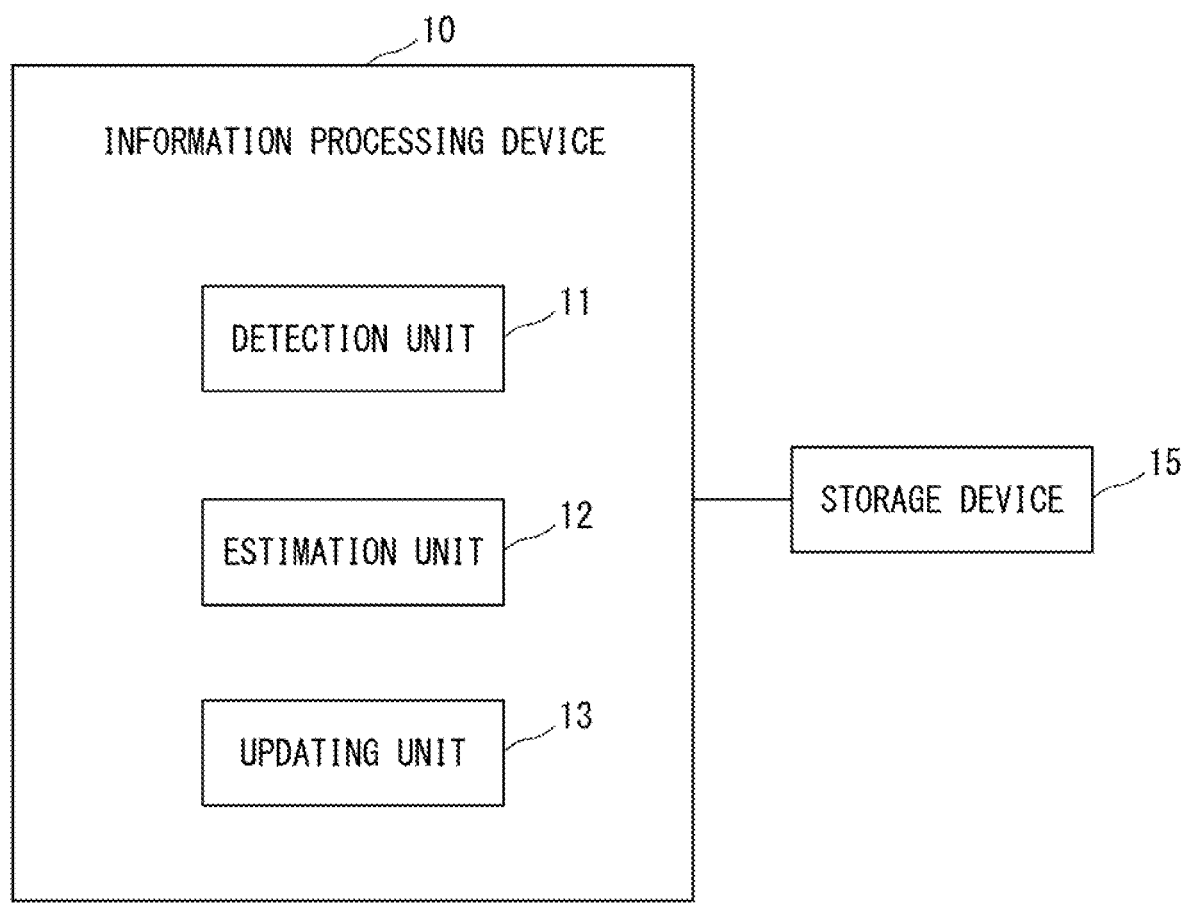
FIG. 1 is a configuration diagram of an information processing device according to a first example embodiment.

Example embodiments of the present disclosure will be described below with reference to the drawings. An example of a configuration of an information processing device 10 according to a first example embodiment will be described with reference to FIG. 1. The information processing device 10 may be a computer device that operates when a processor executes a program stored in a memory. The information processing device 10 may be, for example, a server device.

The information processing device 10 includes a detection unit 11, an estimation unit 12, and an updating unit 13. The detection unit 11, the estimation unit 12, and the updating unit 13 may be software or a module in which processing is executed by a processor executing a program stored in a memory. Alternatively, the detection unit 11, the estimation unit 12, and the updating unit 13 may be hardware such as a circuit or a chip.

The detection unit 11 detects presence of an obstacle by using a measurement value of received power measured by a measurement device that receives a wireless radio wave. The wireless radio wave may simply be referred to as a radio wave. The measurement device may be, for example, a sensor capable of receiving a wireless radio wave and measuring received power. Receiving a wireless radio wave may be referred to as receiving a wireless signal. The detection unit 11 may acquire a measurement value of received power from the measurement device via a network, for example. Alternatively, when the measurement device is used as an integrated device with the information processing device 10, the detection unit 11 may acquire the measurement value being output from the measurement device via an internal bus or the like of the information processing device 10.

The detection unit 11 detects an obstacle existing between a transmitter that transmits a wireless signal and a receiver by using, for example, a position of the transmitter, a measurement position of received power, and an attenuation rate of a radio wave of a wireless signal received at the measurement position. The attenuation rate may be referred to as a propagation loss. For example, the detection unit 11 may detect an obstacle by comparing an attenuation rate at a measurement position which is estimated when the obstacle does not exist with an attenuation rate of actual received power at the measurement position. The detection unit 11 may detect an obstacle by using an attenuation amount instead of the attenuation rate.

The estimation unit 12 estimates a change in received power in a predetermined area before detecting the presence of an obstacle and after detecting the presence of the obstacle. Before detecting the presence of the obstacle and after detecting the presence of the obstacle may be referred to as, for example, before the obstacle is detected and after the obstacle is detected by the detection unit 11.

The estimation unit 12 may estimate a value of received power in a predetermined area by performing simulation, and estimate a change in received power in the predetermined area before detecting the presence of the obstacle and after detecting the presence of the obstacle. The estimation unit 12 may estimate a received power distribution in a predetermined area before the presence of the obstacle is detected and a received power distribution in the predetermined area after the presence of the obstacle is detected by using, for example, a ray trace method. The change in received power may be, for example, a value indicating a difference between the received power before detecting the presence of the obstacle and the received power after detecting the presence of the obstacle in the predetermined area.

The updating unit 13 updates the received power distribution in the predetermined area stored in a storage device 15, which is generated based on the measurement value before detecting the presence of the obstacle, by using the change in received power. The received power distribution in the predetermined area generated based on the measurement value before detecting the presence of the obstacle may be generated or calculated by using an IDW method or a Kriging method with respect to the measurement value of the received power in the predetermined area. The updating unit 13 may reflect a change in received power estimated by the estimation unit 12 in the received power with respect to the received power distribution in the predetermined area generated based on the measurement value before detecting the presence of the obstacle. For example, when the received power in the predetermined area after detecting the presence of the obstacle is smaller than the received power before detecting the presence of the obstacle, the updating unit 13 may update the received power distribution in such a way as to reduce the received power in the predetermined area. The received power distribution in the predetermined area may be stored in the storage device 15 which is a device different from the information processing device 10, or may be stored in a storage device (not illustrated) included in the information processing device 10. The updating unit 13 may read the received power distribution from the storage device 15 or the storage device included in the information processing device 10. The updating unit 13 may read the received power distribution from the storage device 15 via a network by using at least one of wired and wireless communication, or may read the received power from the storage device 15 by using at least one of wired cable and short-range wireless communication. The short-range wireless communication may be wireless communication using Bluetooth (registered trademark), for example. The storage device included in the information processing device 10 may be, for example, an internal memory mounted inside the information processing device 10 or an external memory attachable to the information processing device 10. The internal memory may be referred to as a main body memory, a built-in memory, or the like.

Figure 2:
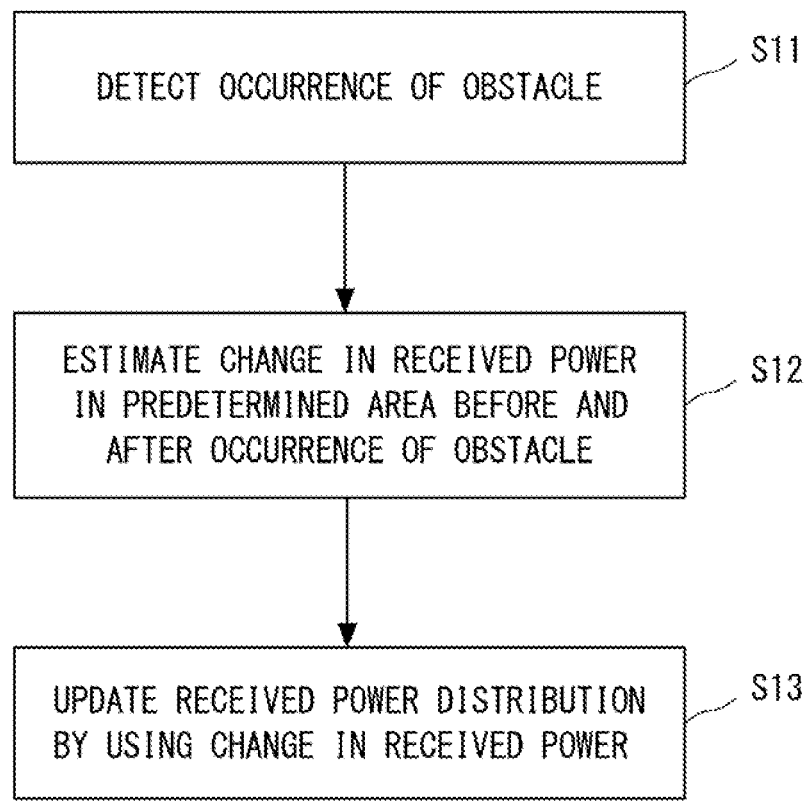
FIG. 2 is a diagram describing a flow of processing of a data generation method according to the first example embodiment.

Next, a data generation method according to the first example embodiment will be described with reference to FIG. 2. First, the detection unit 11 detects presence of an obstacle by using a measurement value of received power measured by a measurement device that has received a wireless radio wave (S11). Next, the estimation unit 12 estimates a change in received power in a predetermined area before detecting the presence of the obstacle and after detecting the presence of the obstacle (S12). Next, the updating unit 13 updates a first received power distribution in the predetermined area generated based on the measurement value before detecting the presence of the obstacle, by using the change in received power (S13).

As described above, the information processing device 10 reflects, in the received power distribution generated based on the measurement value, a change in the received power before and after detecting the presence of an obstacle, which are acquired by simulation. Thereby, the information processing device 10 can generate the received power distribution of a peripheral area of the obstacle after detecting the presence of the obstacle.

Second Example Embodiment

Figure 3:
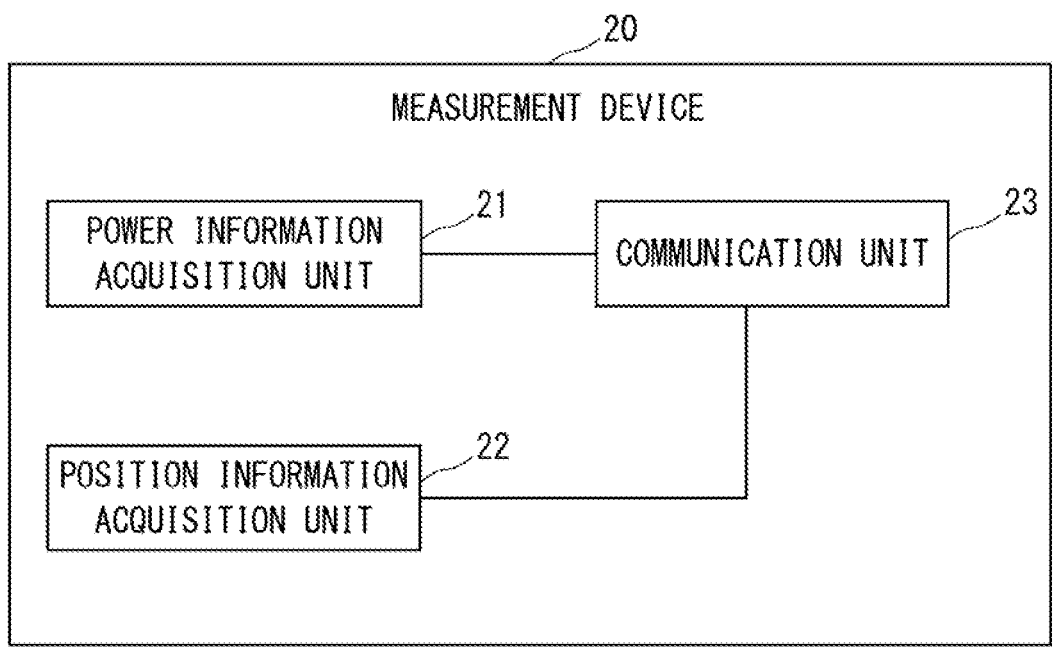
FIG. 3 is a configuration diagram of a measurement device according to a second example embodiment.

Next, an example of configuration of a measurement device 20 according to a second example embodiment will be described with reference to FIG. 3. The measurement device 20 may be a computer device that operates when a processor executes a program stored in a memory. The measurement device 20 may be, for example, a sensor device. Further, the measurement device 20 may be attached to a moving body. The moving body may be, for example, a vehicle. Specifically, the moving body may be an automatic guided vehicle (AGV). Alternatively, the moving body may be a flight body to be controlled by using a wireless signal. Alternatively, a moving person may hold the measurement device 20.

The measurement device 20 includes a power information acquisition unit 21, a position information acquisition unit 22, and a communication unit 23. The power information acquisition unit 21, the position information acquisition unit 22, and the communication unit 23 may be software or a module in which processing is executed by the processor executing a program stored in the memory. Alternatively, the power information acquisition unit 21, the position information acquisition unit 22, and the communication unit 23 may be hardware such as a circuit or a chip.

The power information acquisition unit 21 receives a radio wave transmitted from a transmission source, and measures received power of the received radio wave. In other words, the power information acquisition unit 21 specifies the received power of the received radio wave. Specifying the received power may be referred to as detecting the received power. The transmission source may be referred to as a transmission device or a transmitter. The transmission source may be, for example, an access point to be used as a so-called base station in a wireless local area network (LAN). Alternatively, the transmission source may be a base station to be used for mobile communication. Namely, the transmission source may be a device that transmits a wireless radio wave and forms a communication area that enables wireless communication.

The power information acquisition unit 21 indicates the received power of the radio wave by using units such as dBm or watts. When a plurality of transmission sources are transmitting radio waves, the power information acquisition unit 21 may receive a plurality of radio waves and specify the received power for each radio wave. Alternatively, the power information acquisition unit 21 may combine a plurality of radio waves and specify received power of the combined radio waves. The power information acquisition unit 21 may periodically specify the received power of the received radio wave. Alternatively, the power information acquisition unit 21 may specify the received power of the radio wave at an arbitrary timing, based on operation of a user who operates the measurement device 20, for example. Alternatively, the power information acquisition unit 21 may specify the received power of the radio wave when detecting that the moving body has moved a predetermined distance.

Figure 4:
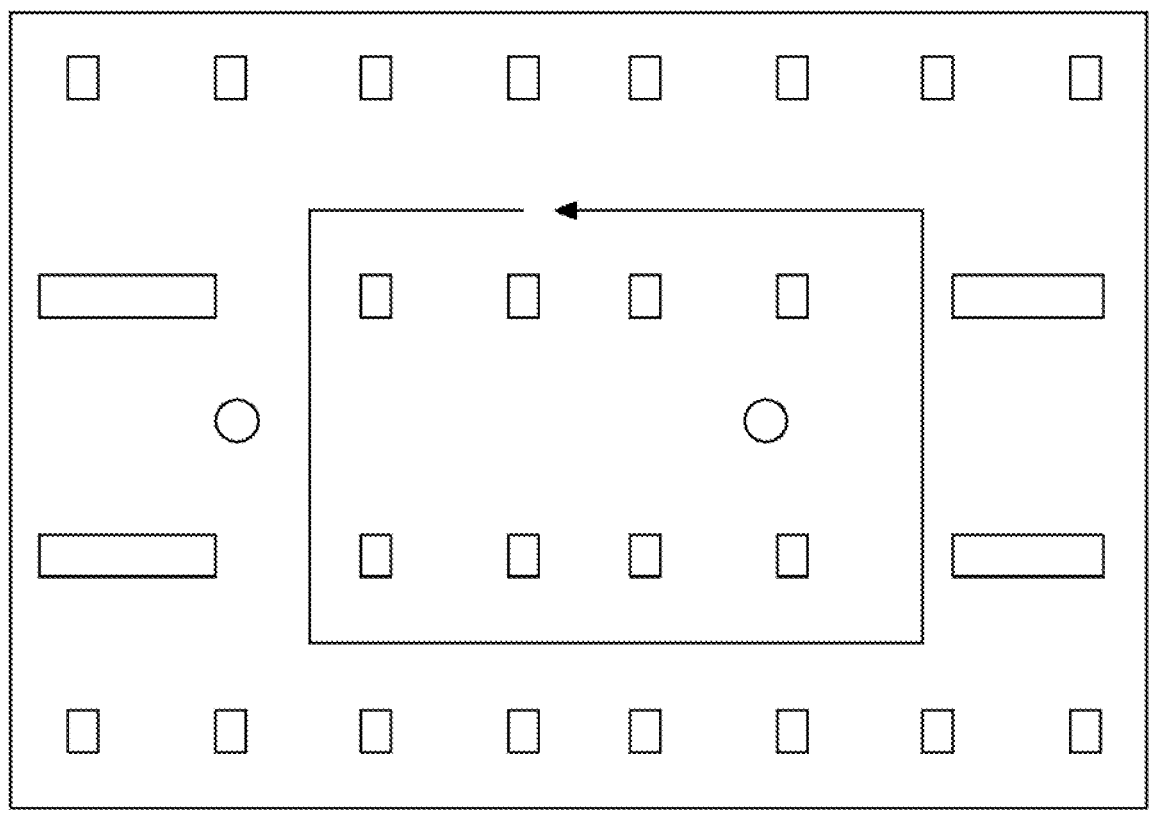
FIG. 4 is a diagram describing measurement of received power within a predetermined area according to the second example embodiment.

Herein, the measurement of the received power in a predetermined area will be described with reference to FIG. 4. FIG. 4 illustrates a diagram viewed from above of an area having a certain space, for example, in a warehouse or a factory where an AGV moves. A plurality of rectangular figures in FIG. 4 indicate obstacles. Since radio waves are shielded by obstacles, the obstacles may be referred to as shields. The obstacle may be, for example, a post, shelf, or the like in a warehouse. A circular figure in FIG. 4 indicates a transmission source of a radio wave. The measurement device 20 moves as indicated by an arrow illustrated in FIG. 4, and measures the received power in the area illustrated in FIG. 4. In addition, the measurement device 20 may measure the received power on a path or a trajectory other than that indicated by the arrow in FIG. 4.

Returning to FIG. 3, the position information acquisition unit 22 acquires position information of the measurement device 20. The measurement device 20 may be installed on a moving body, and may measure a received radio wave while the moving body is moving. The position information acquisition unit 22 may specify the position information of the measurement device 20 by using, for example, a Global Navigation Satellite System (GNSS) such as a Global Positioning System (GPS). Alternatively, the position information acquisition unit 22 may specify the position information of the measurement device 20 by using information on the number of rotations of a tire of the moving object, operation information of a steering wheel, and the like. Alternatively, the position information acquisition unit 22 may recognize in advance a position of the transmission source of the radio wave, and specify the position information according to a value of the received power of the radio wave transmitted from the transmission source.

The position information acquisition unit 22 may specify the position information indicating the current position of the measurement device 20 at a timing when the radio wave received by the power information acquisition unit 21 is measured. Namely, the position information acquisition unit 22 may specify a measurement point at which the radio wave received by the power information acquisition unit 21 is measured.

The communication unit 23 transmits received power information indicating the value of the received power and the position information to an information processing device 30. The communication unit 23 may transmit information to the information processing device 30 via at least one of a wired line and a wireless line. The communication via the wireless line may be, for example, wireless communication used in a mobile network to be managed by a communication carrier, or wireless communication used in wireless LAN communication. Alternatively, the communication unit 23 may communicate with the information processing device 30 by using Bluetooth (registered trademark).

The communication unit 23 associates the received power information with the position information indicating a measurement point at which the received power is measured, and transmits the associated information to the information processing device 30. The association between the received power information and the position information may be performed by the power information acquisition unit 21 or the position information acquisition unit 22.

Figure 5:
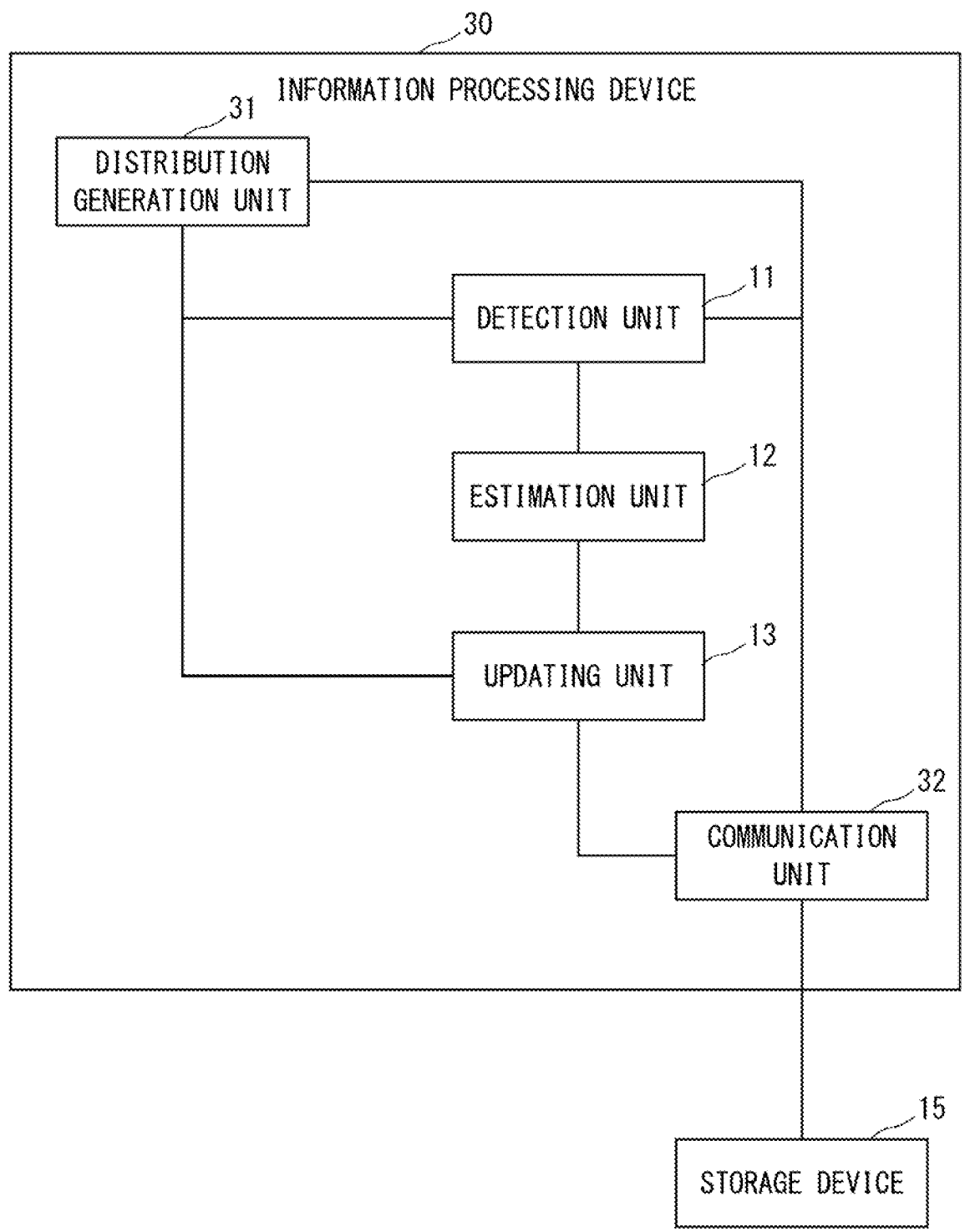
FIG. 5 is a configuration diagram of an information processing device according to the second example embodiment.

Next, an example of configuration of the information processing device 30 according to the second example embodiment will be described with reference to FIG. 5. The information processing device 30 has a configuration in which a distribution generation unit 31 and a communication unit 32 are added to the information processing device 10. The distribution generation unit 31 and the communication unit 32 may be software or a module in which processing is executed by a processor executing a program stored in a memory. Alternatively, the distribution generation unit 31 and the communication unit 32 may be hardware such as a circuit or a chip. Hereinafter, functions and the like different from those of the information processing device 10 of FIG. 1 or detailed functions and the like related to the information processing device 10 will be mainly described.

The communication unit 32 receives the received power information and the position information associated with the received power from the measurement device 20. The position information associated with the received power is position information indicating a measurement point at which the received power is measured. The communication unit 32 outputs the received power information and the position information to the detection unit 11 and the distribution generation unit 31.

The distribution generation unit 31 generates information representing a received power distribution (hereinafter, sometimes referred to simply as "received power distribution") by using the received power information and the position information. For example, the distribution generation unit 31 generates the received power distribution by using the IDW method or the Kriging method. Specifically, the distribution generation unit 31 generates a received power distribution in the area illustrated in FIG. 4. The distribution generation unit 31 holds in advance a map indicating a position of an obstacle or the like in the area illustrated in FIG. 4, and generates a received power distribution by reflecting the received power value in the map. The distribution generation unit 31 outputs the generated received power distribution to the detection unit 11 and the updating unit 13. The distribution generation unit 31 may read out a map stored in the storage device 15 or the storage device included in the information processing device 10. Further, the distribution generation unit 31 may store the generated received power distribution in the storage device 15 or the storage device included in the information processing device 10. The distribution generation unit 31 may communicate with the storage device 15 via the communication unit 32.

The detection unit 11 receives the received power and the position information associated with the received power from the communication unit 32 periodically or at an arbitrary timing. The detection unit 11 compares the received power distribution received from the distribution generation unit 31 with the received power received from the communication unit 32 periodically or at an arbitrary timing. The detection unit 11 determines whether or not a difference between the received power associated with the position information received from the communication unit 32 and the received power indicated by the received power distribution at a position indicated by the position information received from the communication unit 32 is larger than a predetermined value.

For example, the detection unit 11 may detect that the presence of an obstacle is detected around a position where the difference between the received power received from the communication unit 32 and the received power indicated by the received power distribution is larger than a predetermined value. Detecting the presence of an obstacle may be referred to as detecting occurrence of an obstacle. Detecting the occurrence of an obstacle means that an obstacle that does not exist when the distribution generation unit 31 generates the received power distribution occurs after the received power distribution is generated. The obstacle that has occurred may be, for example, a moving vehicle, a walking person, a newly installed shelf, or the like. For example, when the received power illustrated in the received power distribution is larger than the received power received from the communication unit 32, an obstacle occurs between the measurement position of the received power and the transmission source, which indicates that the measurement device 20 has received the radio wave attenuated by an influence of the obstacle. In addition, when the received power indicated by the received power distribution is smaller than the received power received from the communication unit 32, it indicates that the measurement device 20 has received the radio wave directly from the transmission source and has received the radio wave reflected by the obstacle.

The detection unit 11 estimates a position of the obstacle by using the position of the transmission source, the measurement position of the received power, and an attenuation rate or amplification rate of the received power. The detection unit 11 may hold information on the position of the transmission source in advance.

Figure 6:
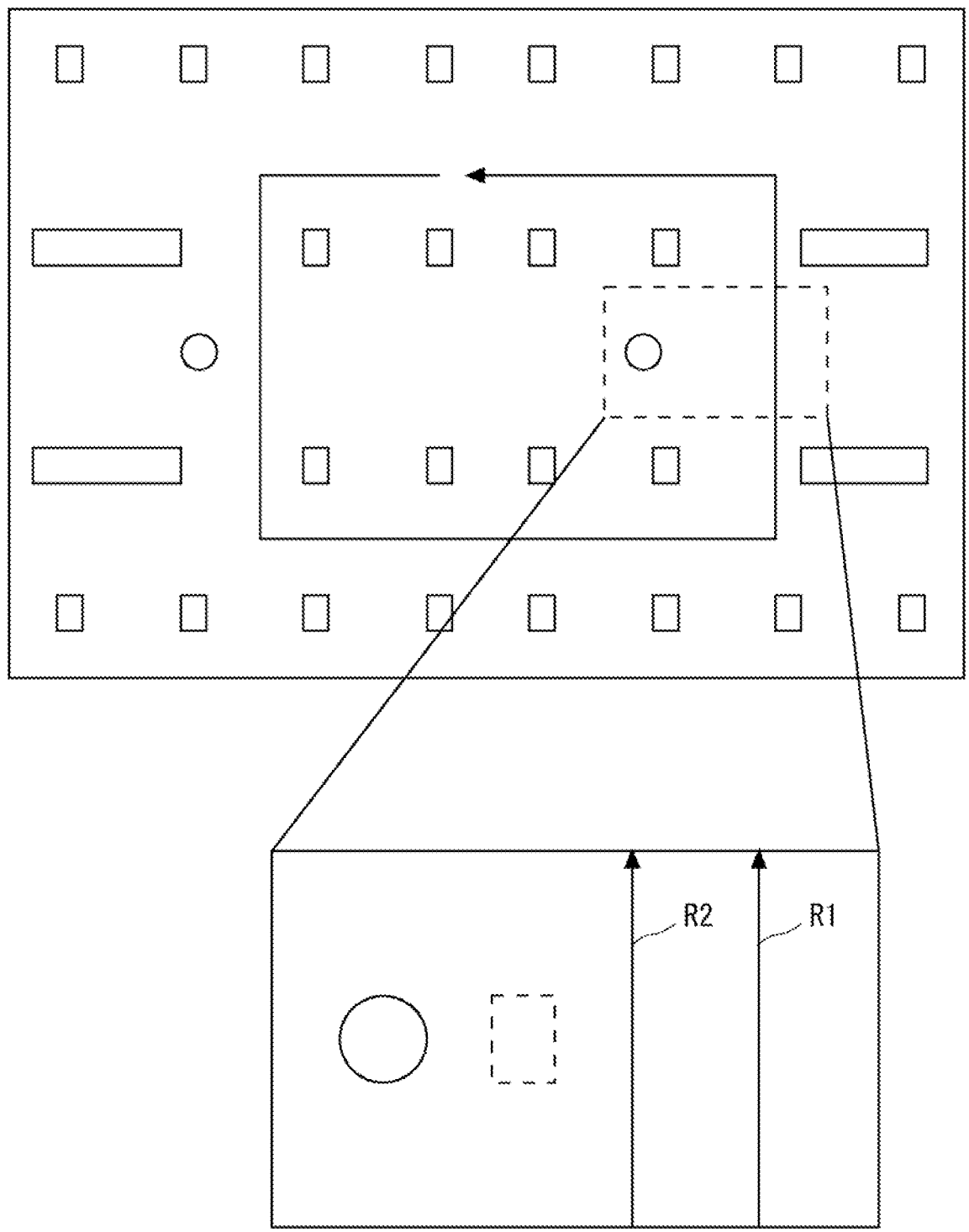
FIG. 6 is a diagram describing measurement of received power in a predetermined area according to the second example embodiment.

FIG. 6 illustrates a state in which a part of the area surrounded by a dotted line in the area described in FIG. 4 is extracted. FIG. 6 illustrates a locus of the measurement device 20 observing a radio wave, a transmission source of the radio wave, and a newly occurring obstacle. A rectangular figure of the dotted line in the extracted area indicates an obstacle that has newly occurred after the received power distribution is generated. A trajectory R1 indicates a trajectory in which the measurement device 20 has observed a radio wave before an obstacle occurs. A trajectory R2 indicates a trajectory in which the measurement device 20 has observed the radio wave after the obstacle occurs.

At a position on the trajectory R2 where the radio wave transmitted from the transmission source is attenuated by the newly occurring obstacle and the attenuated radio wave is received, the value of the received power is lower than the value illustrated in the received power distribution. Herein, even when the value of the received power on the trajectory R2 is reflected in the received power distribution, it is impossible to reflect information in which the received power is lowered or increased in the periphery of the trajectory R2, i.e., in the periphery of the newly occurring obstacle. In other words, even when the value of the received power on the trajectory R2 is reflected in the received power distribution, only the received power on the trajectory R2 decreases or increases, and the value of the received power at a position different from the trajectory R2 becomes the same as the value of the received power illustrated in the received power distribution. Therefore, the estimation unit 12 estimates an influence on the newly occurring obstacle.

Figure 7:
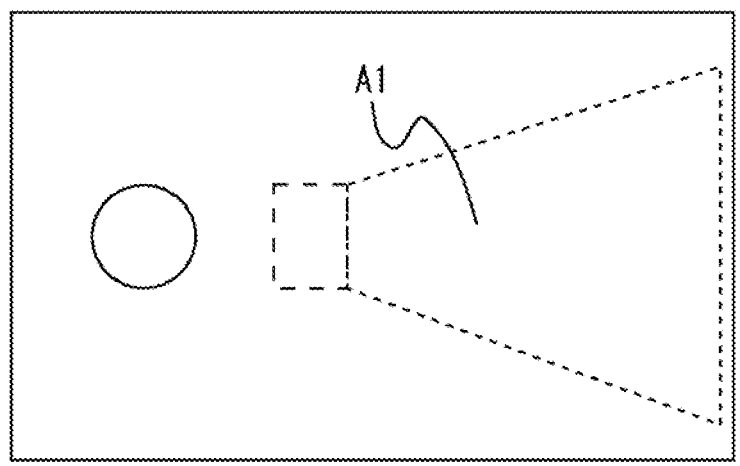
FIG. 7 is a diagram illustrating an area in which an obstacle affects received power according to the second example embodiment.

The estimation unit 12 simulates the received power around the newly occurring obstacle by using the position of the obstacle estimated by the detection unit 11, the position of the transmission source, transmitted power of the radio wave to be transmitted by the transmission source, an angle of an antenna in the transmission source, and the like. The estimation unit 12 may hold in advance information relating to the position of the transmission source and the transmitted power of the radio wave to be transmitted by the transmission source. For example, the estimation unit 12 simulates the received power of an area A1, which is illustrated in FIG. 7. A1 is an area in which radio waves to be transmitted from a transmission source are interrupted by a newly occurring obstacle, and the received power is estimated to be lowered. For example, the estimation unit 12 may estimate the received power of the A1 area by executing ray tracing using the position of the obstacle estimated by the detection unit 11, the position of the transmission source, and the transmitted power of the radio wave to be transmitted by the transmission source. The estimation unit 12 may use information on the angle of the antenna at the transmission source when performing the ray tracing. The estimation unit 12 acquires a power distribution in consideration of diffraction of an electromagnetic wave or the like by executing the ray tracing. Alternatively, the estimation unit 12 may estimate the received power at A1 by applying the position of the obstacle, the position of the transmission source, the transmitted power of the radio wave to be transmitted by the transmission source, and the like to a learning model generated by using a measurement value of received power of a radio wave being blocked by the obstacle as teacher data, which is measured in advance.

The updating unit 13 updates the received power distribution by reflecting a simulation result in the estimation unit 12 in the received power distribution generated by the distribution generation unit 31. The updating unit 13 may read out the received power distribution stored in the storage device 15 or the storage device included in the information processing device 10. Further, the updating unit 13 may store the updated received power distribution in the storage device 15 or the information processing device 10. The updating unit 13 may communicate with the storage device 15 via the communication unit 32.

The communication unit 32 transmits the updated received power distribution to a display device or the like.

Figure 8:
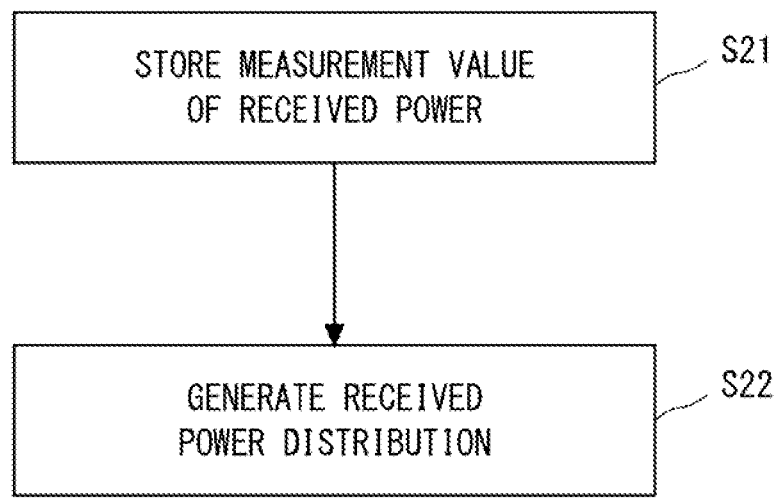
FIG. 8 is a diagram explaining a flow of generation processing of a received power distribution according to the second example embodiment.

Next, a flow of generation processing of the received power distribution in the distribution generation unit 31 will be described with reference to FIG. 8. First, the distribution generation unit 31 receives a measurement value of received power measured by the measurement device 20 and position information indicating the measurement position of the received power from the measurement device 20 (S21). For example, as illustrated in FIG. 6, the measurement device 20 measures the received power while moving within the area as indicated by the trajectory R1.

Herein, the received power distribution measured by the measurement device 20 will be described in detail with reference to FIG. 9. FIG. 9 illustrates an area from which an area considered to be particularly affected by a newly appearing obstacle is extracted. For example, FIG. 9 illustrates the received power distribution in the A1 area of FIG. 7. In FIG. 9, a case where the measurement device 20 receives a radio wave in a 400 MHz band will be described as an example. When receiving a wireless signal, the measurement device 20 receives a radio wave in a frequency band having a certain width. Herein, it is assumed that wireless communication subject to interference is used with a frequency width of 1 MHz centered on 400 MHz, and the measurement device 20 receives a wireless radio wave in this frequency band.

First, the measurement device 20 receives a radio wave of 400 MHz±0.5 MHz for about one second, and stores an average value thereof as the received power, and further stores the measurement position as the position information. The measurement device 20 repeats the measurement of the received power and the storage of the position information every second, and circulates around a predetermined path in a region in which the received power distribution is generated. The measurement device 20 transmits the measured received power and the position information to the information processing device 30. The measurement device 20 may periodically transmit a plurality of pieces of received power and position information collectively to the information processing device 30, and may transmit the received power and position information to the information processing device 30 every time one piece of the received power and position information is acquired. A time during which the measurement device 20 measures the received power is not limited to one second, and may be changed according to accuracy of the received power distribution.

For example, the distribution generation unit 31 may calculate the received power distribution by using a measurement value for one round after the information processing device 30 makes one round of the path. FIG. 9 illustrates a measurement value of received power measured by the measurement device 20 in a certain area. The measurement value may be referred to as an actual measurement value, a measurement value, or the like. For example, the measurement device 20 moves along a leftmost column of FIG. 9, measures the received power every second, and then moves along a third column from the left, and measures the received power. Values illustrated in the drawing are values in units of dBm and rounded off a decimal point.

Returning to FIG. 8, the distribution generation unit 31 generates the received power distribution by using the received power and position information which have been received (S22). For example, the distribution generation unit 31 generates the received power distribution by using the IDW method or the Kriging method. For example, the measurement device 20 uses the actual measurement value illustrated in FIG. 9 and supplements the received power at a position where the actual measurement value does not exist, by using the IDW method or the Kriging method, as illustrated in FIG. 10. In this manner, the distribution generation unit 31 combines the actual measurement value and an estimation value estimated by using the IDW method or the Kriging method and generates the received power distribution.

Figure 11:
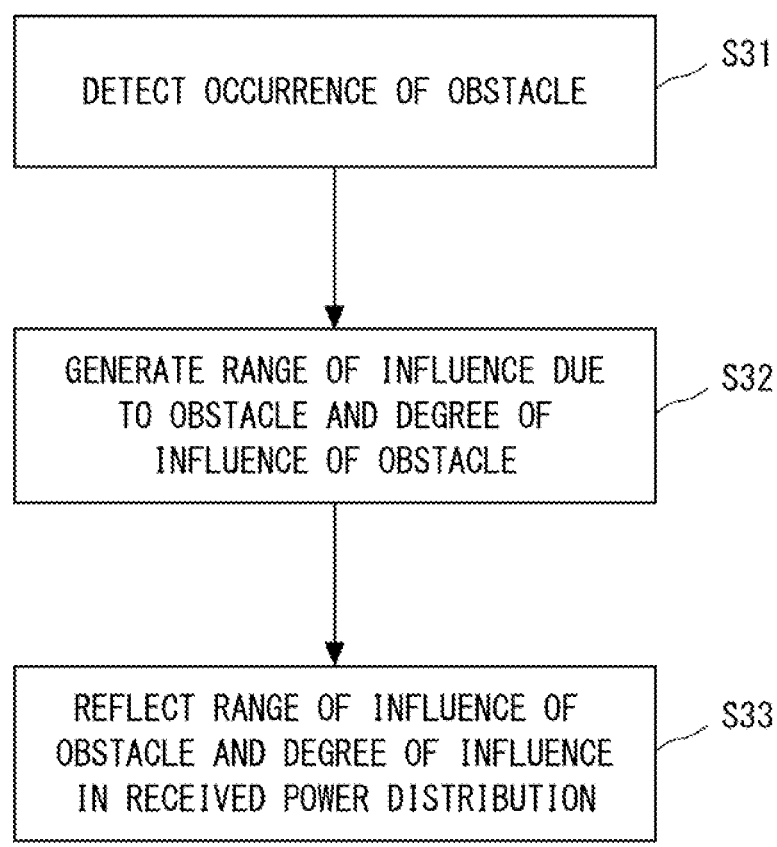
FIG. 11 is a diagram illustrating a flow of updating processing of a received power distribution according to the second example embodiment.

Next, a flow of updating processing of the received power distribution in the updating unit 13 will be described with reference to FIG. 11. Herein, similarly to FIG. 9, a case where the measurement device 20 receives a radio wave in a 400 MHz band while moving will be described as an example.

First, the detection unit 11 detects occurrence of an obstacle by using the received power that is received from the communication unit 32 periodically or at an arbitrary timing (S31). For example, the detection unit 11 receives the received power illustrated in FIG. 12. FIG. 12 illustrates actual measurement values of received power in the same area as the received power distribution illustrated in FIG. 10. Specifically, the detection unit 11 newly receives the received power in the leftmost column of FIG. 12. The received power value in the third column from the left in FIG. 12 is a previous actual measurement value. The received power in the leftmost column of FIG. 12 has a value of —97 in the second row from the top, a value of —99 in the third row, and a value of —97 in the fourth row, and has a difference of 7 to 9 dBm from the value illustrated in the received power distribution of FIG. 10.

The detection unit 11 may determine that an obstacle has occurred when the difference between the value of the received power distribution and the actual measurement value is larger than a threshold value. For example, when the threshold value is 5 dBm, the detection unit 11 determines that the received power at a position of the leftmost column of FIG. 12 and the second to fourth rows from the top in FIG. 12 has a low value due to the influence of a newly occurring obstacle. Further, the detection unit 11 estimates the position of the obstacle by using the position of the transmission source, the measurement position of the received power, and the attenuation rate or amplification rate of the received power. Instead of the attenuation and amplification rates, attenuation and amplification amounts may be used. The detection unit 11 may hold information on the position of the transmission source in advance.

Returning to FIG. 11, next, the estimation unit 12 generates a range of influence due to the obstacle and a degree of influence of the obstacle (S32). Specifically, the estimation unit 12 simulates the received power around the newly occurring obstacle by using the position of the transmission source being held in advance, the transmitted power of the radio wave to be transmitted by the transmission source, and the position of the obstacle estimated by the detection unit 11. The estimation unit 12 simulates a received power distribution before an obstacle occurs and a received power distribution after an obstacle newly occurs, for example, by executing ray tracing. FIG. 13 illustrates a simulation result of the received power distribution before an obstacle occurs, and FIG. 14 illustrates a simulation result of the received power distribution after an obstacle newly occurs. FIG. 15 illustrates a difference distribution between the received power distribution before an obstacle occurs and the received power distribution after an obstacle newly occurs. The difference distribution indicates a value acquired by subtracting each value of the received power distribution of FIG. 13 from each value of the received power distribution of FIG. 14. FIG. 14 illustrates that the area of the received power distribution illustrated in FIG. 10 is affected by an obstacle. The difference distribution in FIG. 15 illustrates how much the received power decreases due to the influence of an obstacle. FIG. 13 is a received power distribution generated by simulation, and a difference in value between the received power distribution of FIG. 13 and the received power distribution of FIG. 10 generated based on an actual measurement value occurs.

Next, the updating unit 13 reflects the range of influence of the obstacle and the degree of influence of the obstacle, which are estimated by the estimation unit 12, in the received power distribution (S33). For example, the updating unit 13 acquires the received power distribution in consideration of the influence of the obstacle by taking the sum of the received power distribution of FIG. 10 and the difference distribution of FIG. 15. FIG. 16 illustrates the updated received power distribution acquired by taking the sum of the received power distribution of FIG. 10 and the difference distribution of FIG. 14.

As described above, the information processing device 30 determines the presence or absence of an obstacle, based on the measurement value of the received power in a certain area. Further, the information processing device 30 generates the range of influence of the obstacle and the degree of influence of the obstacle on the received power distribution by executing the simulation. Further, the information processing device 30 generates a received power distribution reflecting the influence of the obstacle on the received power distribution. As a result, the information processing device 30 can update the received power distribution by using not only the received power of a part of the area used for detecting the occurrence of the obstacle, but also the received power in the range affected by the occurrence of the obstacle.

Third Example Embodiment

Next, update processing of a received power distribution according to a third example embodiment will be described with reference to FIG. 17. FIG. 17 illustrates an actual measurement value of received power measured by the measurement device 20 after the received power distribution illustrated in FIG. 10 is generated. FIG. 17 illustrates measurement values different from FIG. 12. The detection unit 11 detects that an obstacle has newly occurred, based on the measurement values of the received power illustrated in FIG. 17. Herein, it is assumed that a simulation result in the estimation unit 12 is the received power distribution illustrated in FIGS. 13 and 14, similarly to the second example embodiment. Namely, in the third example embodiment, a range of influence of the obstacle and a degree of influence of the obstacle, which are acquired by simulation to be executed by the estimation unit 12 are the same as those in FIGS. 13 and 14 specified in the second example embodiment. On the other hand, a value illustrated in FIG. 17 is used instead of the value illustrated in FIG. 12 as the actual measurement value of the received power used for detecting the obstacle.

Herein, similarly to the second example embodiment, when the difference distribution of FIG. 15 acquired by the simulation is reflected in the received power distribution illustrated in FIG. 10, an influence of a newly occurring obstacle becomes larger than the actual measurement value illustrated in FIG. 17. Specifically, in FIG. 17, the second to fourth received powers from the top in the leftmost column are —93 or —95. On the other hand, when the difference distribution of FIG. 15 acquired by the simulation is reflected in the received power distribution illustrated in FIG. 10, as illustrated in FIG. 16, the second to fourth received powers from the top in the leftmost column are —95 or —97.

Therefore, in the third example embodiment, a value of the difference distribution to be summed with the received power distribution is adjusted as follows. Herein, let Pr be the received power distribution illustrated in FIG. 10, which is generated by the distribution generation unit 31. Further, let Pne be the received power distribution before an obstacle occurs, which is acquired as a simulation result, and Pe be the received power distribution after the obstacle occurs, which is acquired as a simulation result. In this case, when the difference distribution is defined as Pd, Pd=Pe—Pne is calculated.

Further, when the received power distribution updated based on the difference distribution is defined as Pm, Pm is denoted by Pm=Pr+aPd. Let a be a positive value. In addition, letting L be a position to be determined by designating a column and a row, which is illustrated in FIG. 17 or the like, the position may be denoted as Pm(L)=Pr(L)+aPd(L). In this case, Pm(L)=Pr(L)+aPd(L) indicates a value of the updated received power at the position L. The position L indicates a position specified by using a mass in the area illustrated in FIG. 17 or the like. For example, the position L may indicate one mass, a plurality of masses for one column, a plurality of masses for one row, a plurality of masses dispersed, and the like.

Figures 18, 19:
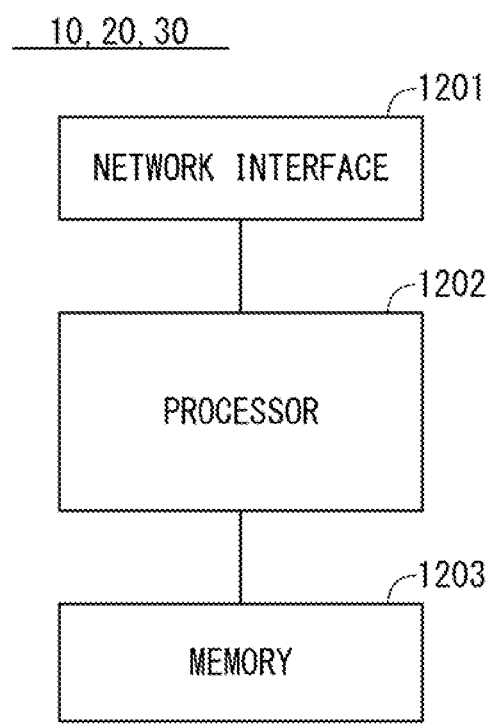
FIG. 18 is a diagram illustrating a received power distribution according to the third example embodiment.
FIG. 19 is a configuration diagram of an information processing device and a measurement device according to each example embodiment.

Herein, in the second example embodiment, it is assumed that the received power distribution Pm is calculated with a=1. On the other hand, in the third example embodiment, for example, the value of a may be 0.5. In this case, the received power distribution Pm becomes the distribution illustrated in FIG. 18. In FIG. 18, values rounded off after the decimal point are illustrated. In this manner, by setting the value of a to 0.5, a value of the received power distribution illustrated in FIG. 18 can be made closer to the actual measurement value illustrated in FIG. 17 compared to the case where a=1.

Herein, the value to be multiplied by the difference distribution is not limited to 0.5. For example, such a value of a that minimizes a square error between the received power distribution Pm and the actual measurement value in FIG. 17 may be calculated. For example, when a=1, a difference between the measurement value in FIG. 17 and the received power of the received power distribution Pm associated to the position where the measurement value has been measured is [(−90, −97, −99, −97, −90)−(−90, −93, −95, −93, −90)]=(0, −4, −4, −4, 0). In this case, the square error is 48 when a sum is calculated by squaring each element indicating the difference. When a=0.5, the sum is calculated by squaring each element indicating the difference to be 0.75. When the value of a is searched for in this manner, the sum is calculated by squaring each element indicating the difference at a=0.49 to be 0.71, which is the minimum. In such a case, the updating unit 13 may adopt a=0.49.

When Pm(L)=Pr(L)+aPd(L), the value of a may be acquired as a=(min(R)—max(R)/[min(Pd(L))—max(Pd(L))]). [/] is a symbol representing division. min(R) and max(R) indicate minimum and maximum values of the actual measurement values illustrated in FIG. 17. In addition, min(Pd(L)) and max(Pd(L)) indicate the minimum value and the maximum value of the values illustrated in the difference distribution illustrated in FIG. 15. The value of a thus calculated is 5/9.

As described above, by adding the value acquired by multiplying the value of the received power in the difference distribution by a coefficient a to the received power distribution Pr, the value of the updated received power distribution Pm can be made close to the actual measurement value.

FIG. 19 is a block diagram illustrating an example of configuration of the information processing device 10, the measurement device 20, and the information processing device 30 (hereinafter, referred to as the information processing device 10 and the like). Referring to FIG. 19, the information processing device 10 and the like include a network interface 1201, a processor 1202, and a memory 1203. The network interface 1201 may be used to communicate with network nodes (e.g., eNB, MME, P-GW, ...). The network interface 1201 may include, for example, a network interface card (NIC) compliant with IEEE 802.3 series. Herein, eNB represents evolved Node B, MME represents Mobility Management Entity, and P-GW represents Packet Data Network Gateway. IEEE represents Institute of Electrical and Electronics Engineers.

The processor 1202 reads software (a computer program) from the memory 1203 and executes the software (computer program), thereby performing processing of the information processing device 10 and the like described with reference to the flowcharts in the above-described example embodiments. The processor 1202 may be, for example, a microprocessor, MPU, or CPU. The processor 1202 may include a plurality of processors.

The memory 1203 is composed of a combination of a volatile memory and a nonvolatile memory. The memory 1203 may include a storage located remotely from the processor 1202. In this case, the processor 1202 may access the memory 1203 via an I/O (Input/Output) interface that is not illustrated.

In the example of FIG. 19, the memory 1203 is used to store software module groups. The processor 1202 reads out these software module groups from the memory 1203 and executes them, thereby performing the processing of the information processing device 10 and the like described in the above-described example embodiment.

As described with reference to FIG. 19, each of the processors included in the information processing device 10 and the like in the above-described example embodiment executes one or a plurality of programs including a group of instructions for causing a computer to execute the algorithm described with reference to the drawings.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-mentioned example embodiments, and can be modified as appropriate within a range not deviating from the gist. For example, in the example embodiment described above, a case where the received power value decreases due to an obstacle has been described, but even when there is a region where the received power value increases due to an influence of reflection, the calculation can be performed in the same manner.

The first, second, and third embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An information processing device comprising:
   at least one memory storing instructions, and
   at least one processor configured to execute the instructions to;
      detect presence of an obstacle by using a measurement value of received power measured by a measurement device that receives a wireless radio wave;
      estimate a change in received power in a predetermined area before detecting presence of the obstacle and after detecting presence of the obstacle; and
      update a first received power distribution in the predetermined area, the first received power distribution being stored in a storage device and being generated based on the measurement value before detecting presence of the obstacle, by using the change in received power.

2. The information processing device according to claim 1, wherein the at least one processor is further configured to execute the instructions to estimate a change in received power in the predetermined area by using a position of a transmission source of the wireless radio wave and a position of the obstacle.

3. The information processing device according to claim 1, wherein
   the at least one processor is further configured to execute the instructions to generate a difference distribution indicating a difference between a second received power distribution in the predetermined area before detecting presence of the obstacle, the second received power distribution being estimated by using a position of a transmission source of the wireless radio wave, and a third received power distribution in the predetermined area after detecting presence of the obstacle, the third received power distribution being estimated by using a position of a transmission source of the wireless radio wave and a position of the obstacle, and
   update the first received power distribution by using the difference distribution.

4. The information processing device according to claim 3, wherein the at least one processor is further configured to execute the instructions to correct the difference distribution by using a measurement value measured after detecting presence of the obstacle, and update the first received power distribution by using the corrected difference distribution.

5. The information processing device according to claim 3, wherein, when a difference value of received power in a first area included in the difference distribution and a value of received power in the first area included in the first received power distribution are added, at least one processor is further configured to execute the instructions to calculate a coefficient to be multiplied by the difference value in such a way that a value after addition approaches a measurement value in the first area, and update the first received power distribution by adding a value acquired by multiplying all difference values included in the difference distribution by the coefficient to the first received power distribution.

6. A data generation method comprising:
   detecting presence of an obstacle by using a measurement value of received power measured by a measurement device that receives a wireless radio wave;
   estimating a change in received power in a predetermined area before detecting presence of the obstacle and after detecting presence of the obstacle; and
   updating a first received power distribution in the predetermined area, the first received power distribution being stored in a storage device and being generated based on the measurement value before detecting presence of the obstacle, by using the change in received power.

7. A non-transitory computer readable medium storing a program causing a computer to execute:
   detecting presence of an obstacle by using a measurement value of received power measured by a measurement device that receives a wireless radio wave;
   estimating a change in received power in a predetermined area before detecting presence of the obstacle and after detecting presence of the obstacle; and
   updating a first received power distribution in the predetermined area, the first received power distribution being stored in a storage device and being generated based on the measurement value before detecting presence of the obstacle, by using the change in received power.

* * * * *